3,691,014
METHOD FOR PRODUCING PROTEASE
Masao Isono and Katsumi Tomoda, Hyogo, Koichi Miyata, Osaka, Kazutaka Maejima, Hyogo, and Reijiro Kodama, Kyoto, Japan, assignors to Tokeda Chemical Industries, Ltd., Higashiyodogawa-ku, Osaka, Japan
Continuation-in-part of application Ser. No. 641,001, May 24, 1967. This application Oct. 9, 1969, Ser. No. 868,280
Int. Cl. C12d 13/10
U.S. Cl. 195—62
5 Claims

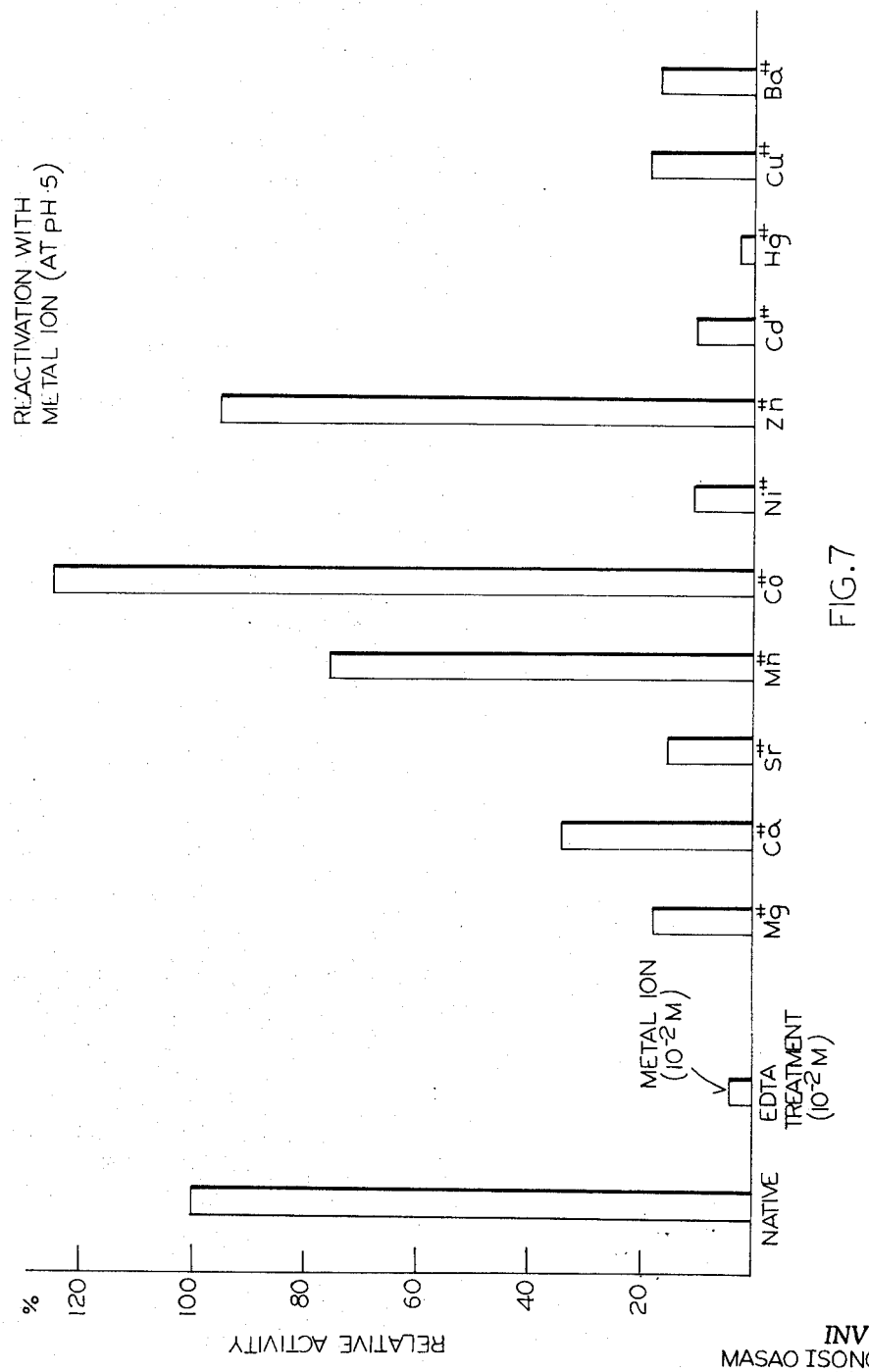

ABSTRACT OF THE DISCLOSURE

A protease which has strong caseinolytic and fibrinolytic activities is abundantly produced by Serratia sp. E–15 when the microorganism is cultivated in a medium containing milk casein and soybean meal extract. The protease is recovered from the culture medium and purified, and the purified protease is used as an effective antiinflammatory agent.

---

Figure 1:
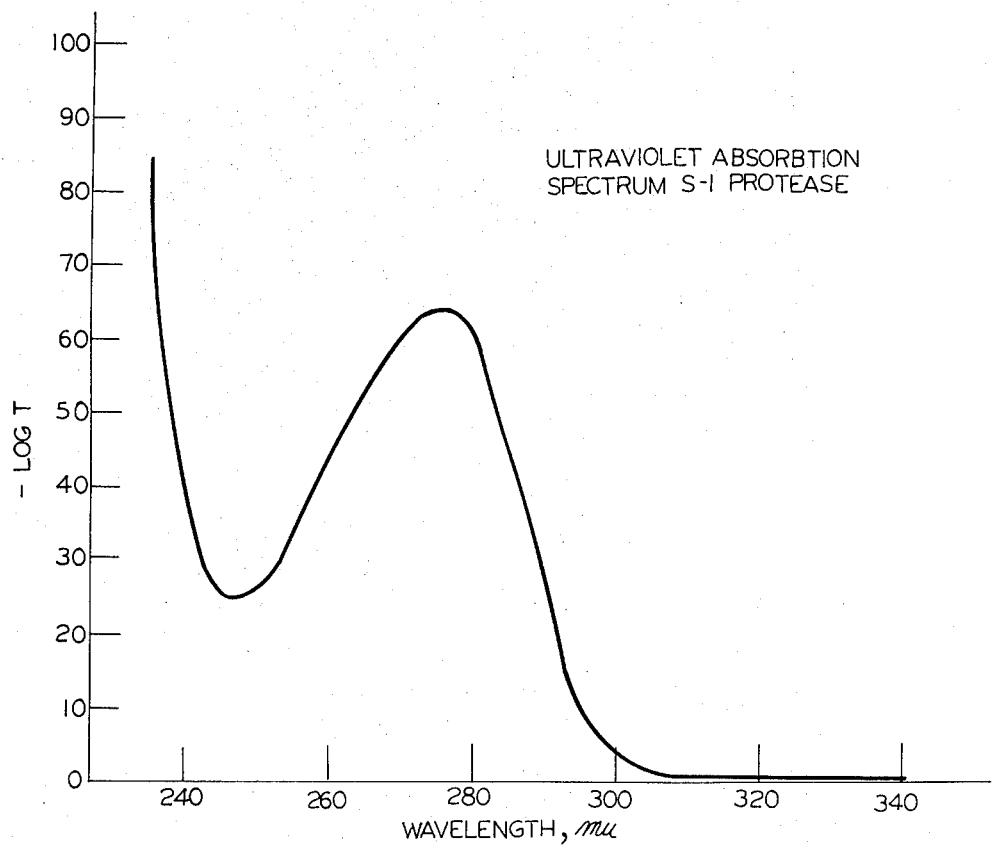

The present application is a continuation-in-part of application Ser. No. 641,001, filed May 24, 1967, now abandoned.

The present invention relates to a protease which shows strong caseinolytic and fibrinolytic activities and which is useful as an anti-inflammatory agent, and to a process for producing the protease which is pure and sufficiently highly active to be used for the intended purpose set forth below. This invention also relates to a novel use of the protease as an anti-inflammatory agent.

It has been discovered by the present inventors that a bacterium which had been isolated by them and named Serratia sp. E–15 produces a protease which has strong proteolytic activity. Their further study revealed that the protease-productivity of E–15 is remarkably enhanced under specific conditions. As a result, it has become possible to obtain the protease in a highly purified form, so that the protease can be used for medical purposes as well as for studies of enzymatic properties thereof. The availability of the purified protease produced by E–15 contributed to the present inventors' further finding that the protease shows unusually high caseinolytic and fibrinolytic activities and that it can be administered to animals (including human beings) without substantial harm to the latter and without being inactivated, and also that the protease exhibits an anti-inflammatory effect much stronger than that of known anti-inflammatory agents such as phenylbutazone.

The principal object of the present invention is to provide a protease which is purified highly enough to be free from any hazards for novel use as an anti-inflammatory agent.

Another object of this invention is to provide a specific process for producing the protease abundantly and easily.

A further object is to provide an anti-inflammatory composition comprising said protease; this object is interrelated with another object of providing a method for treating inflammation in animals with the composition.

In order to realize these objects of the present invention, a bacterium, Serratia sp. E–15 or its mutant or variant is cultivated in a culture medium. Serratia sp. E–15 was isolated by the present inventors from a silkworm intestine, and shows the following microbiological properties:

Microbiological properties of Serratia sp. E–15.

Short rods. 0.8 to 1.0 by 1.2 to 1.8 microns. Endospore not formed. Motile by means of peritrichous flagella. No acid-fast. Gram-negative.

Agar colonies: Smooth, usually circular, grayish white. Pink pigment may diffuse in the medium, if produced.
Broth: Rapidly turbid. Liquid becomes pink after prolonged cultivation.
Gelatin stab: Rapid stratiform liquefaction.
Milk: Coagulation. Peptonization.
Casein: Hydrolyzed.
Esculin: Hydrolyzed.
Urea: Slightly hydrolyzed.
Starch: Not hydrolyzed.
Arginine: Hydrolyzed.
Nitrites: Produced from nitrates.
Hydrogen sulfide: Not produced.
Indole: Not formed.
Ammonia and trimethylamine: Produced.
Voges-Proskauer test: Positive.
Methyl red test: Faint.
Citrates: Utilized as sole source of carbon.
Ammonium salts: Not utilized as sole source of nitrogen.
Methylene blue dye: Reduced.
Cytochrome oxidase reaction: negative. Grows on KCN-media.
Acid produced from maltose, sucrose, cellobiose, trehalose, glucose, fructose, mannose, galactose, ribose, salicin, glycerol, mannitol, adonitol and inositol.
Acid not produced from starch, dextrin, inulin, rhaffinose, lactose, melibiose, melezitose, sorbose, rhamnose, arabinose, xylose, methylglucoside and dulcitol.
Optimal temperature for growth: 30° C. No growth at 45° C.
Salt tolerance: Grows in 7.5% NaCl. No growth in 8% NaCl.
Catalase positive.
Distinctive characters: Pigment from this organism reveals a characteristic spectrum of prodigiosin which has an absorption maximum at 540 m$\mu$ wavelength in an acidic medium. The pigment is freely soluble in ethanol, methanol and water.

According to Bergey's "Manual of Determinative Bacteriology," 7th edition (1957), these microbiological properties indicate that the bacterium E–15 belongs to:

The class—Schizomycetes
the order—Eubacteriales
the family—Enterobacteriaceae
the tribe—Serratieae
the genus—Serratia Although E–15 most resembles *Serratia piscatorum* among the species presented in Bergey's Manual as those belonging to the genus Serratia, E–15 cannot be designated as *S. piscatorum*, because *S. piscatorum* does not hydrolyze urea and produces pigment within 8-hour cultivation, while E–15 does hydrolyze urea and does not produce pigment within 8-hour cultivation. Moreover, the pigment produced by E–15 is different from that of *S. piscatorum* in its solubility in water. Therefore, the strain E–15 is different from hitherto-known strains belonging to the genus Serratia; the said strain is referred to in this specification as "Serratia sp. E–15", or simply as "E–15."

As is well known as one of the general conceptions of microorganisms, their microbiological characteristics are not generally fixed, and many natural or induced mutants or variants can be derived from Serratia sp. E–15. Artificial induction of the mutation or variation can be effected by per se known procedures, for example, by irradiating Serratia sp. E–15 with ultraviolet ray or X-ray, or by treating the microorganism with a chemical compound such as nitrogen mustard, magnesium chloride, etc. These mutants or variants are also used in the present invention as far as they retain the originally endowed protease producibility. Therefore, it should be understood that hereinafter in the general description of this specification, the reference "E–15" includes these mutants and variants.

A specimen of Serratia sp. E–15 has been deposited at American Type Culture Collection, Maryland, U.S.A. under the accession number ATCC 21074.

In order to cultivate E–15, conventional culture media for Serratia can be used. However, the protease productivity of E–15 is greatly affected by the constituents of the cutlure media, especially by the organic nitrogen source. The protease can be produced in a culture medium which comprises any assimilable nitrogen sources such as ammonium salts, nitrates, corn-steep liquor, peptone, casein, meat extract, soybean meals, etc. However, in view of the resultant protease productivity of E–15, co-employment of milk casein and soybean meal extract results in a striking increase in the protease productivity which enables an abundant production of a very active and purified protease to be realized. The synergetic effect of the co-employment of milk casein and soybean meal extract is specific, and the effect is not observed to be any greater in other combinations.

Soybean meal extract is prepared by extracting soybean meal or defatted soybean meal with water at room temperature (about 20° to 25° C.) for about 30 minutes under stirring, and by filtering off the insolubles. In the present invention, "X% (weight per volume) of soybean meal extract" means a product which is prepared by adding X part(s) by weight of soybean meal or defatted soybean meal to 100 parts by volume of water, stirring the mixture at room temperature for about 30 minutes, and subjecting the thus treated mixture to filtration to remove the insolubles therein. The following tests will show how much of the milk casein and soybean mean extract should be used for advantageous production of the protease. In the specification and claims, percentages of culture medium constituents are on a weight per volume basis.

TEST 1

Ten culture media (A) to (J) were prepared by adding 2% of milk casein and a varied amount of soybean meal extract as illustrated in Table 1 to a basic culture medium (pH 7.0) which consists of 1% of ammonium phosphate, 0.05% of potassium chloride, 0.1% of sodium chloride, 0.02% of calcium chloride (2 hydrate), 0.02% of magnesium sulfate (7 hydrate), 0.5% of soybean oil and water. Serratia sp. E–15 was cultivated in each of the 10 culture media at 28° C. for 2 days using a rotary shaker. Respective culture broths were centrifuged to remove cells, and the protease activity of each supernatant solution was measured by the method of Kunitz (J. Gen. Physiol. 30, 291, 1947) at a pH of 9 and a temperature of 37° C. to give the results shown in Table 1.

One protease unit (PU) was defined as the enzyme amount producing 1μg equivalent of tyrosine per minute from casein at 37° C.

TABLE 1

| Culture medium | Amount of soybean meal extract (percent) | Protease activity (PU/ml.) |
| --- | --- | --- |
| A | 0 | 672 |
| B | 0.5 | 1,460 |
| C | 1.0 | 3,750 |
| D | 2.0 | 4,170 |
| E | 5.0 | 4,740 |
| F | 10.0 | 4,370 |
| G | 15.0 | 3,500 |
| H | 20.0 | 2,880 |
| I | 25.0 | 2,180 |
| J | 30.0 | 2,010 |

TEST 2

Seven culture media (K) to (Q) were prepared by adding 2% of soybean meal extract and a varied amount of milk casein as illustrated in Table 2 to the basic culture medium which had the same composition as in Test 1. The same procedure as in Test 1 gave the result shown in Table 2:

TABLE 2

| Culture medium | Amount of milk casein (percent) | Protease activity (PU/ml.) |
| --- | --- | --- |
| K | 0 | 928 |
| L | 0.5 | 1,570 |
| M | 1.0 | 3,750 |
| N | 2.0 | 4,230 |
| O | 5.0 | 4,250 |
| P | 10.0 | 4,330 |
| Q | 15.0 | 2,120 |

The synergistic effect between milk casein and soybean meal extract is obvious from the result of Tests 1 and 2, and it is most apparent when the respective concentrations of milk casein and soybean meal extract in the culture medium are about 1 to about 10 percent and about 1 to about 15 percent.

This synergistic effect is so specific that it is not observed when nitrogen sources other than milk casein are used together with soybean meal extract, as shown in Test 3.

TEST 3

To an aqueous culture medium which has the same composition as that of the basic medium used in Test 1, there was added 1% of soybean meal extract. The mixture was divided into six equal portions. One was used for control, and the other five portions were used in the test after the addition of 1% of an additional nitrogen source, i.e. cornsteep liquor, gelatin, casein hydrolyzate (casamino acid), peptone or milk casein. The same procedures for cultivation and protease activity assay as in Test 1 gave the results shown in Table 3.

TABLE 3

| Additional nitrogen source: | Protease activity (PU/ml.) |
| --- | --- |
| None | 670 |
| Cornsteep liquor | 505 |
| Gelatin | 1,090 |
| Casein hydrolyzate | 1,240 |
| Peptone | 1,880 |
| Milk casein | 3,660 |

So far as both milk casein and soybean meal extract in the optimum amount are used in the culture medium, it is not necessary to use any other particular carbon sources. It is recommended not to use a particular carbon source such as glucose, sucrose, maltose or dextrin, because the addition of such carbon source will acidify the culture medium and the acidified medium will provide undesirable conditions for producing highly active protease.

Other nutrients such as metal salts, phosphates, vitamins and growth factors are usually added to the medium. As far as such additional nutrients are concerned, E–15 can grow on a culture medium which contains ordinary nutrients for the cultivation of Serratia. However, it is preferable to use a medium containing calcium chloride and phosphates such as sodium phosphate, potassium phosphate, ammonium phosphate, etc. for the purpose of fostering protease production. A preferable amount of calcium chloride is about 0.01 to about 0.05%, especially about 0.02%, in terms of $CaCl_2 \cdot 2H_2O$, and that of the phosphate is about 0.7 to about 1.5% in terms of $PO_4$.

The cultivation of E–15 is carried out under aerobic conditions. Practically, it is preferred to cultivate E–15 in an aqueous medium under shaking or in a tank under stirring and aeration. The preferred aeration rate is usually about 0.5 to 1 liter per minute per liter of aqueous medium.

Although other specific cultivation conditions should be determined concurrently so as to give the highest production of protease, it is generally preferred during the cultivation to adjust the temperature to about 25° to 35°

C. and the pH of the medium to neutral (pH 6 to pH 9), especially pH 7. The maximum production of the protease usually occurs after 15 to 40 hours of cultivation.

The protease is thus produced by E-15 during the cultivation and is accumulated in the culture medium. When the protease activity in the medium is higher than 3,000 PU/ml. isolation of the protease is very easy and the so-obtained pure protease is highly active. For separating and purifying the protease, any of the per se known means for separation and purification which are commonly used in this field are appropriate, such as precipitation by use of a precipitation aid, precipitation at the isoelectric point, salting out, dialysis, ion-exchange chromatography, gel filtration, etc.

In the following examples, parts by weight bear the same relation to parts by volume as do grams to milliliters.

Example

Serratia E-15 (ATCC 21074) is inoculated in 30,000 parts by volume of a culture medium (pH 7) consisting of 1% of milk casein, 1% of soybean meal extract, 1% of $(NH_4)_2HPO_4$, 0.1% of NaCl, 0.05% of KCl, 0.02% of $CaCl_2 \cdot 2H_2O$, 0.02% of $MgSO_4 \cdot 7H_2O$, 0.3% of soybean oil and water. The culture is incubated at 28° C. for 30 hours under stirring and aeration at a rate of 0.5 liters/minute/liter of the medium. Protease activity of the culture supernatant at various stages during the cultivation is shown in Table 4.

TABLE 4

| Cultivation time (hrs.) | pH of culture medium | Protease activity (PU/ml.) |
| --- | --- | --- |
| 0 | 7.09 | |
| 6 | 6.92 | 242 |
| 12 | 6.85 | 2,640 |
| 18 | 6.90 | 3,370 |
| 24 | 6.72 | 4,060 |
| 30 | 6.50 | 3,740 |

After 24 hours cultivation, 5,000 parts by volume of the culture broth is centrifuged to obtain 4,800 parts by volume of the thus obtained supernatant, and $(NH_4)_2SO_4$ is added thereto up to 66% saturation to give precipitates. The resulting precipitates are collected, dissolved in 100 parts by volume of water and subjected to dialysis through a cellophane membrane (tradename "Visking," Visking Co., U.S.A.) against distilled water at 5° C. for 2 days. 400 parts by volume of the inside solution so obtained is subjected to fractional precipitation by the stepwise addition of acetone, and the fraction that precipitates between 40% and 60% by volume of acetone is collected by centrifugation and dried to obtain a crude enzyme preparation.

Three parts by weight of the crude enzyme preparation is dissolved in 100 parts by volume of distilled water, and the solution is subjected to dialysis through "Visking" against 0.01 M phosphate buffer solution of pH 7.0 at 5° C. for 2 days. 120 parts by volume of the dialized inside solution is allowed to flow through a column having a volume of about 1200 parts and being packed with DEAE-cellulose which is previously bufferized with 0.01 M phosphate buffer solution of pH 7.0, whereupon the enzyme is adsorbed on the column. The enzyme is eluted with 0.1 M aqueous sodium chloride solution and the eluate is fractionated in portions of 10 parts by volume. To 120 parts by volume of the enzyme rich fractions, $(NH_4)_2SO_4$ is added up to 66% saturation to give precipitates. The precipitates are collected and dissolved in 30 parts by volume of 0.01 M phosphate buffer solution of pH 7.0. The enzyme solution is subjected to gel-filtration through a column of Sephadex G-75 (trade name for dextran particles for gel-filtration, sold by Pharmacia Co., Sweden) having a volume of about 400 parts, followed by precipitation again with 66% saturation of $(NH_4)_2SO_4$. The resulting precipitates are again dialized through "Visking" against distilled water at 5° C. for 3 days. 55 parts by volume of the inside solution is lyophilized to give about 1 part by weight of purified protease, the protease activity of which is 4,400 PU/mg.

The protease of the present invention as obtained in the example shows the following properties:

(1) The enzyme resembles the nature of a uniform and single protein when observed by means of centrifugation analysis. The sedimentation constant ($S_{20w}$) measured by ultracentrifuge is 3.8 S, from which the molecular weight is determined to be about $6 \times 10^4$ according to the Archibald method (cf. W. J. Archibald: J. Phys. & Colloid Chem., 51, 1204, 1947).

(2) Elementary analysis: C, 47.39%; H, 7.18%; N, 15.18%.

(3) The ultraviolet absorption spectrum is shown in FIG. 1, which indicates that the curve is of a typical protein which has a maximum absorption at a wavelength of 275 to 278 m$\mu$ and a shoulder at 290 m$\mu$.

Figure 2:
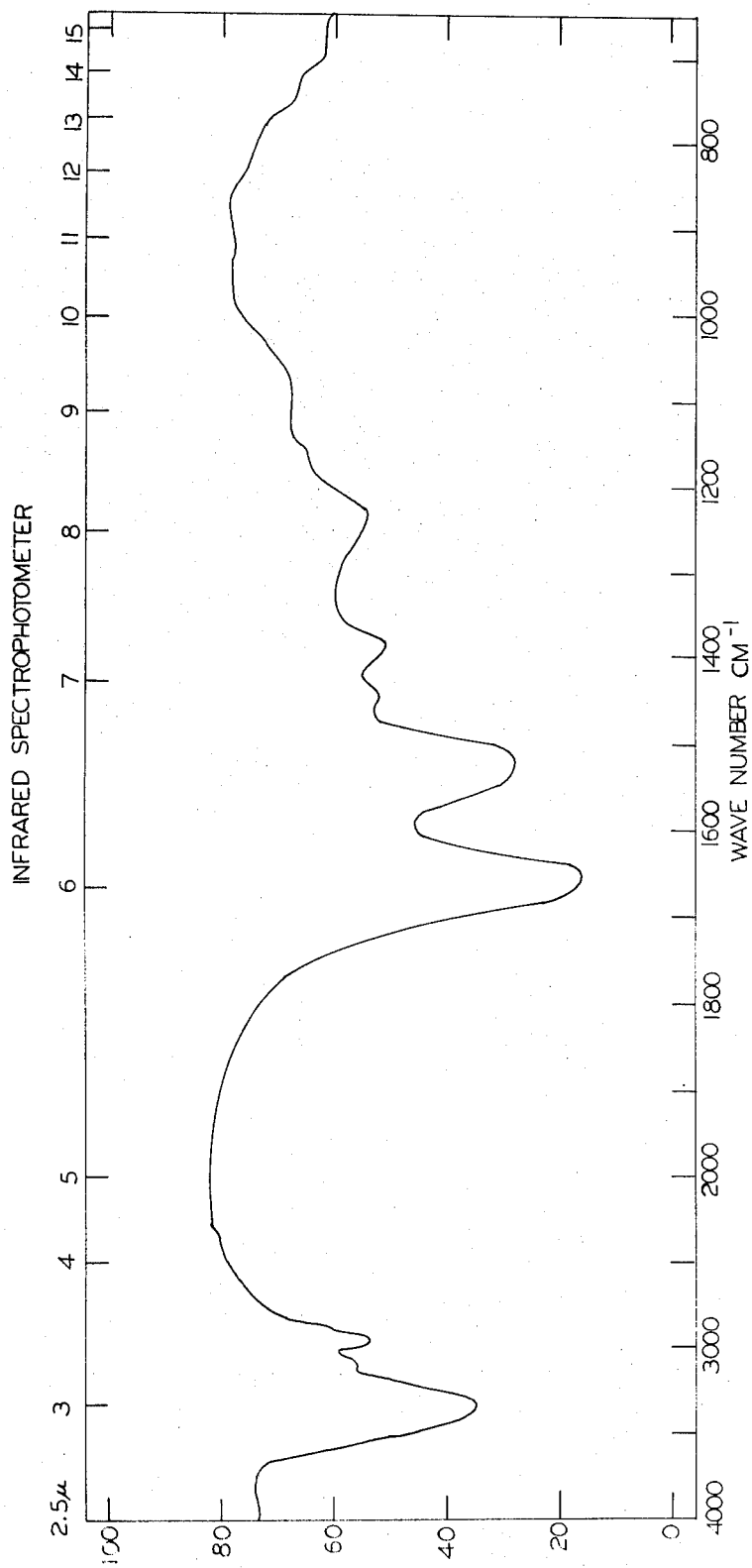

(4) The infrared absorption spectrum is shown in FIG. 2, and shows significant absorption bands at the following wavelengths (in microns): 3.0 (strong), 3.38 (middle), 6.05 (broad, strong), 6.55 (broad, strong), 6.88 (weak), 7.15 (broad, middle), 8.12 (middle) and 9.3 (broad, weak).

(5) The isoelectric point measured by paper electrophoresis is between pH 5 and 6.

Figure 3:
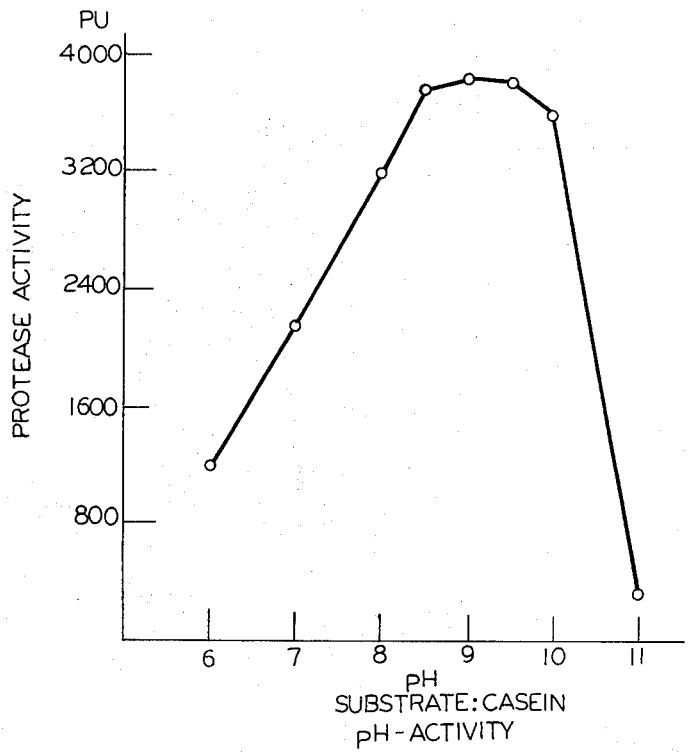
Figure 4:
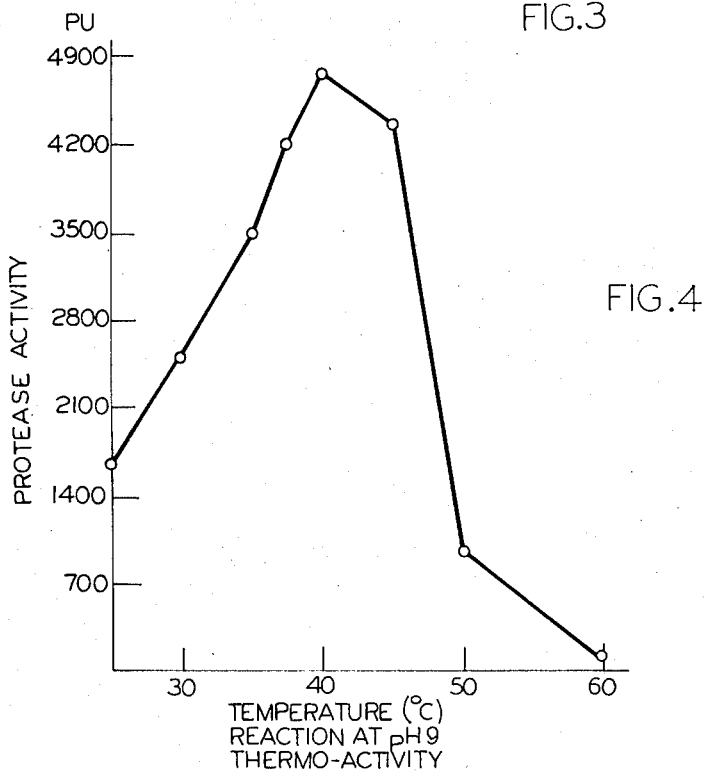

(6) The optimal enzyme activity is exhibited at a pH of from 8.5 to 9.5 as shown in FIG. 3 and a temperature of from 35° to 45° C., especially around 40° C., as shown in FIG. 4.

Figure 5:
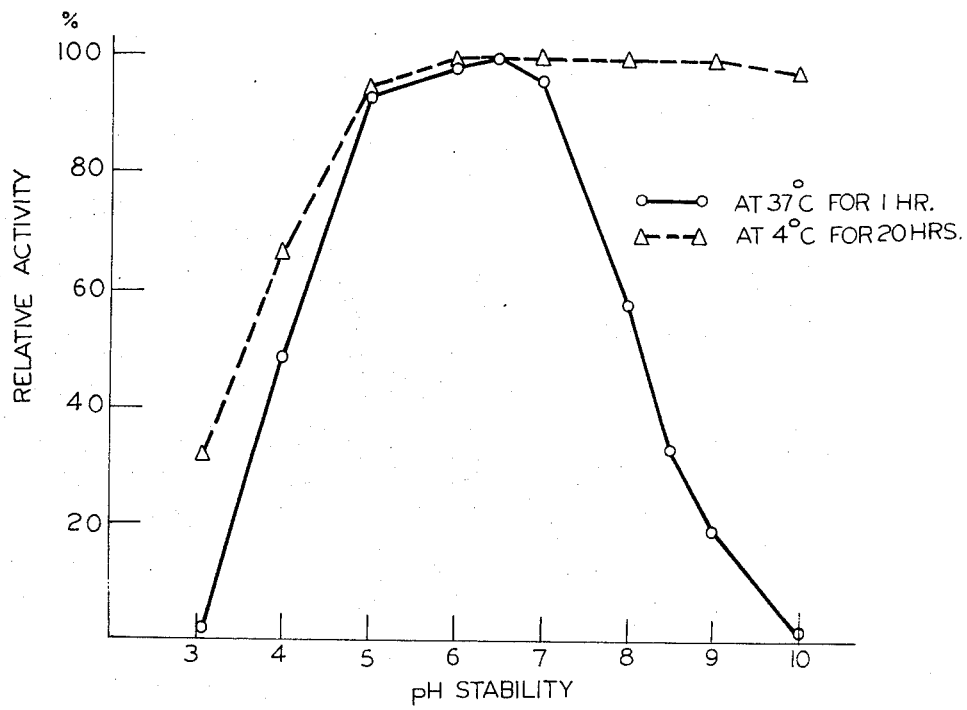

(7) The pH stability is shown in FIG. 5, in which the solid line shows the stability at 37° C. and the broken line shows the stability at 4° C., from which it is observed that the enzyme is stable at a pH between 5 and 7 at 37° C. and is still stable even at pH 10 at 4° C.

Figure 6:
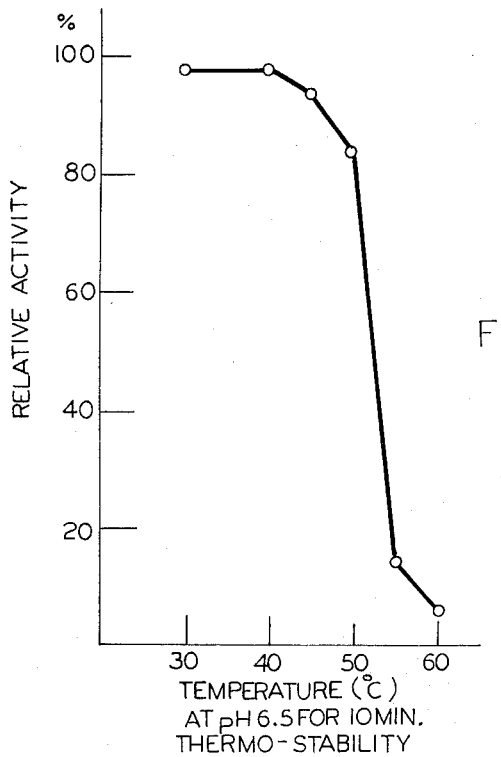

(8) The thermostability when measured by heating the enzyme solution for 10 minutes without a substrate is shown in FIG. 6, which shows that the enzyme is stable at 40° C. but the activity is lost upon 10 minutes of heating at 60° C.

(9) The enzyme activity is inhibited in the presence of $Ni^{++}$, $Cd^{++}$, $Cu^{++}$ or $Hg^{++}$, while it is enhanced in the presence of $Co^{++}$ to the extent of 20 to 30%.

(10) The enzyme activity is inhibited in the presence of ethylenediamine tetraacetate at a pH from 4 to 6 as shown in FIG. 7, but the activity is restored by the addition of $Zn^{++}$, $Mn^{++}$ or $Co^{++}$.

(11) The enzyme activity is not inhibited in the presence of p-chloromercuribenzoates or diisopropyl fluorophosphate.

The thus obtained protease is highly active in its proteolytic activity, especially in caseinolytic and fibrinolytic activities. In comparison with known alkaline or neutral proteases, the protease of this invention is stronger in its proteolytic activity, as shown in Tables 5 and 6.

TABLE 5

| Enzyme | Caseinolytic activity (PU/mg.) | |
| --- | --- | --- |
|  | pH 7.1 | pH 9.0 |
| E-15 protease | 2,100 | 3,612 |
| Chymotrypsin | 611 | 688 |
| Bromelin | 106 | 104 |
| Pronase | 418 | 710 |

TABLE 6

| Enzyme: | Amount of enzyme required for dissolving fibrin clot within 10 minutes, $\mu$g./ml. |
| --- | --- |
| E-15 protease | 4 |
| Chymotrypsin | 50 |
| Bromelin | >100 |
| Pronase | 50 |

In view of the stability and the optimal activity of the protease at about 37° C., in the neighborhood of neutral pH, the protease of this invention is used as an effective digestive or anti-inflammatory agent. The following test is a comparison between the protease of the present invention and phenylbutazone in anti-inflammatory effect.

TEST 4

The illustrated amount of test sample was injected intraperitoneally into female rats weighing 120 to 150 grams. Thirty minutes thereafter, an irritant was injected to a hind paw of the rats as well as those rats utilized as a control, to which no test compounds had been administered. Then the capacity of the swelling due to the irritant was measured every hour. Inhibitory activities against the inflammatory edema caused by the irritants, i.e. (1) 0.05 ml. of 1% aqueous carrageenin solution, (2) 0.05 ml. of 6% aqueous dextran solution and (3) 0.05 ml. of 10% aqueous ovalbumin solution, are shown in Table 7 in terms of swelling percent.

120 grams, every day for a month. Groups consisting of 15 rats were schedules as follows:

| Group | Sex | Dose (mg./kg./day) | Remarks |
|---|---|---|---|
| 1 | Male | 0 | Control. |
| 2 | Female | 0 | |
| 3 | Male | 3 | Dosage corresponds to 10 times as much as the usual dosage for human beings. |
| 4 | Female | 3 | |
| 5 | Male | 15 | Dosage corresponds to 50 times as much as the usual dosage for human beings. |
| 6 | Female | 15 | |
| 7 | Male | 60 | Dosage corresponds to 120 times as much as the usual dosage for human beings. |
| 8 | Female | 60 | |

In comparison with the control groups (Groups 1 and 2), none of the test groups (Groups 3 to 8) showed substantial difference in general appearance, body weight, blood liver function, blood sugar level, serum electrolytes, urine excretion or weights of viscera.

As shown above, the protease of this invention is substantially non-toxic, and exhibits a strong anti-inflammatory activity when administered orally.

TABLE 7

| Irritant | Test sample | Dosage, mg./kg. | Time after injection of irritant (hrs.) | | | | | |
|---|---|---|---|---|---|---|---|---|
| | | | 0 | 1 | 2 | 3 | 4 | 5 |
| (1) | E-15 portease (4,000 PU/mg.) | 5 | 0 | 20 | 26 | 23 | 26 | 24 |
| | | 10 | 0 | 10 | 13 | 17 | 16 | 13 |
| | E-15 protease (3,159 PU/mg.) | 20 | 0 | 15 | 19 | 20 | 21 | 20 |
| | | 50 | 0 | 7 | 6 | 13 | 14 | 13 |
| | Phenylbutazone | 50 | 0 | 13 | 19 | 22 | 24 | 23 |
| | Control | 0 | 0 | 53 | 71 | 76 | 81 | 80 |
| (2) | E-15 protease (3,159 PU/mg.) | 20 | 0 | 37 | 41 | 36 | 34 | 32 |
| | | 50 | 0 | 16 | 18 | 17 | 16 | 15 |
| | Phenylbutazone | 50 | 0 | 58 | 60 | 54 | 52 | 50 |
| | Control | 0 | 0 | 54 | 76 | 79 | 80 | 78 |
| (3) | E-15 protease (3,159 PU/mg.) | 20 | 0 | 41 | 42 | 38 | 35 | 35 |
| | | 50 | 0 | 14 | 15 | 15 | 12 | 11 |
| | Phenylbutazone | 50 | 0 | 53 | 63 | 63 | 58 | 56 |
| | Control | 0 | 0 | 64 | 88 | 86 | 84 | 81 |

From Table 7, it is clearly apparent that the protease of the present invention shows for superior anti-inflammatory and anti-swelling activity as compared to that of phenylbutazone.

Acute toxicity of the protease (3157 PU/mg.) in mice or rats after 72 hours from administration is shown in Table 8. The range in brackets shows a 95% confidence limit.

TABLE 8

| Administration | Mice | Rats |
|---|---|---|
| Oral | No animal died at 2,500 mg./kg. | No animal died at 2,000 mg./kg. |
| Subcutaneous | 44 (36.1–53.78) | |
| Intraperitoneal | 18.34 (14.32–23.49) | |
| Intravenous | 14.23 (12.45–16.26) | |

In order to test the subacute toxicity, the protease (3157 PU/mg.) of the present invention was orally administered to rats (Wister strain), each weighing about Unlike hitherto-known steriodal anti-inflammatory agents which often cause metabolic disturbance due to pituitary and adrenal abnormality, the protease of this invention acts directly on the inflammation without effecting the pituitary or adrenal system, so that the latter protease provides a safer countermeasure against inflammation than the former agents.

Moreover, the protease of this invention is effectively absorbed through the intestine wall so that it is easily administered per os. However, in order to avoid the affection of acid gastric juice, it is preferable that the protease be administered per os in the form of an entericly-coated preparation. When the protease is administered orally, the usual daily dose for a human adult is from about 5 to about 60, more preferably, from about 15 to about 30 milligrams of the enzyme which has a protease activity higher than 2,000 PU/mg.

For the purpose of giving those skilled in the art a better understanding of the invention, the following illustrative examples of the preparation are given.

(1) A capsule filled with enteric granule—

Capsule prescription (per capsule):  Mg.
- Protease of the present invention (10,000 PU)__ 5
- Lactose _____ 46
- Corn starch _____ 16
- Crystalline cellulose _____ 12
- Celluose glycollic acid _____ 5
- Sorbitol _____ 10

94

(2) An enteric tablet—

Tablet prescription (per tablet):  Mg.
- Protease of the present invention (10,000 PU)__ 5
- Lactose _____ 79
- Corn starch _____ 45
- Gelatin _____ 0.5
- Magnesium stearate _____ 0.5

130

What is claimed is:

1. A method for producing a protease which comprises cultivating Serratia sp. E–15 (ATCC 21074) in an aqueous culture medium containing from about 1 to about 10% of milk casein, from about 1 to about 15% of soybean meal extract and such other nutrients necessary for the growth of the microorganism at a temperature of from 25° to 35° C. under aerobic conditions until the protease is substantially accumulated in the culture broth, and separating the accumulated protease from the liquid part of the culture broth.

2. A method according to claim 1, wherein the cultivation is carried out until the protease activity of the medium has become higher than 3,000 PU/ml.

3. A method according to claim 1, wherein the aqueous culture medium contains from about 0.01 to about 0.05% of $CaCl_2 \cdot 2H_2O$.

4. A method according to claim 1, wherein the aqueous culture medium contains from about 0.7 to about 1.5% of phosphate based on $PO_4$.

5. A unitary protease metabolite of a protease-producing microorganism belonging to the genus Serratia, which has the following properties:

(1) molecular weight of about $6 \times 10^4$,
(2) elementary analysis of about 47.39% by weight of carbon, about 7.18% by weight of hydrogen and 15.18% by weight of nitrogen,
(3) maximum absorption in its ultraviolet absorption spectrum at a wavelength of 275 to 278 millimicrons as indicated in FIG. 1,
(4) infrared absorption spectrum as shown in FIG. 2, wherein the significant absorption bands in microns are as follows: 3.0 (strong), 3.38 (middle), 6.05 (broad, strong), 6.55 (broad, strong), 6.88 (weak), 7.15 (broad, middle), 8.12 (middle) and 9.3 (broad, weak),
(5) isoelectric point between a pH of 5 and 6,
(6) optimal activity at a pH from 8.5 to 9.5 as indicated in FIG. 3, and at a temperature from 35° to 45° C. as indicated in FIG. 4,
(7) stability in the pH range of 5 to 7 at 37° C.,
(8) loss of activity upon being heated at 60° C. for 10 minutes without substrate,
(9) an activity which is inhibited in the presence of $Ni^{++}$, $Cd^{++}$, $Cu^{++}$ or $Hg^{++}$,
(10) an activity which is inhibited in the presence of ethylenediamine tetraacetate but restored by addition of $Zn^{++}$, $Mn^{++}$ or $Co^{++}$, and
(11) protease activity, against casein, of higher than 2,000 PU/mg.

References Cited

UNITED STATES PATENTS 3,492,204   1/1970   Koaze et al. _____ 195—66

FOREIGN PATENTS

41/10,193   1966   Japan _____ 195—62

LIONEL M. SHAPIRO, Primary Examiner

U.S. Cl. X.R.

195—66